Patented Nov. 29, 1932

1,889,090

UNITED STATES PATENT OFFICE

ERICH FREUND, OF WERDER, GERMANY, ASSIGNOR TO THE FIRM HEYL & CO., CHEMISCH-PHARMAZEUTISCHE FABRIK, AKTIENGESELLSCHAFT, OF BERLIN, GERMANY

COMPOUND OF HEXAMETHYLENETETRAMINE AND DIPHOSPHORIC ACID AND PROCESS OF MAKING SAME

No Drawing. Application filed April 20, 1929, Serial No. 356,873, and in Germany April 20, 1928.

Hexamethylenetetramine, when given per os, separates formaldehyde in the bladder if the urine is of alkaline reaction of the urine is acid. Furthermore it is known to increase the acidity of the urine by administering acids together with the hexamethylenetetramine or together with salts of the hexamethylenetetramine. But in spite of this addition of acid it is impossible in many cases to obtain a sufficiently acid reaction of the urine, especially in view of the fact that some diseases of the uropoetic system are accompanied by a neutral or alkaline reaction of the urine. In these cases the hexamethylenetetramine cannot act as a disinfectant because no formaldehyde is separated from hexamethylentetramine in a neutral or alkaline urine.

I have discovered, that, by combining hexamethylenetetramine with compounds of methylene and more especially methylendiphosphoric acid, the compounds obtained have the remarkable and unexpected property of separating a considerable quantity of formaldehyde even in alkaline solutions, as urine. By combining hexamethylenetetramine with methylendiphosphoric acid a crystallizing salt is obtained which, taken per os, shows a typical formaldehyde-disinfection of the urine, even if the reaction of this urine is highly alkaline. These new compounds exhibit a rather surprising high degree of stability. Nor could it be expected that these products would possess altogether higher antiseptical properties than the hexamethylenetetramine itself. The pure methylendiphosphoric acid is not at all a disinfectant. The new products constitute therefore a considerable improvement in the art of producing urine-disinfecting agents. The acidity of the urine will be increased by the acid component of the compound and this fact also assists in separating the very disinfecting formaldehyde from the hexamethylenetetramine. On the other hand this separation of formaldehyde, and the resulting disinfection, will take place even in case of failure to obtain acidification of the urine.

Examples (1) Molecular quantities of hexamethylenetetramine and methylendiphosphoric acid are caused to react in the presence of alcohol. The precipitate is washed, dried and is then ready for immediate use.

(2) To an aqueous solution of hexamethylenetetramine the equimolecular quantity of methylendiphosphoric acid is added. The solution is evaporated in vacuo until crystallization takes place. The reaction product is thus obtained in a pure and crystallized form ready for immediate use.

The reaction product obtained is the hexamethylenetetramine-salt of the methylendiphosphoric acid and contains 1 molecule hexamethylentetramine combined with 1 molecule methylendiphosphoric acid according to the formula $(CH_2)_6N_4 : CH_2(H_2PO_4)_2$ forming hygroscopic snow-white crystals easily soluble in water, only little soluble in alcohol and insoluble in ether. In heating the compound decomposes.

The methylendiphosphoric acid

$$CH_2(OPO(OH)_2)_2$$

may be prepared according Contardi (Chemisches Zentralblatt 1921 vol. III page 629) or in any other way.

What I claim is:

1. The method which consists in combining 1 molecule of hexamethylenetetramine with 1 molecule of methylendiphosphoric acid by dissolving the components in an inert solvent, and separating the precipitating compound.

2. The method which consists in combining 1 molecule of hexamethylenetetramine with 1 molecule of methylendiphosphoric acid by dissolving the components in alcohol, and separating the precipitating compound.

3. The method which consists in combining 1 molecule of hexamethylenetetramine with 1 molecule of methylendiphosphoric acid by dissolving the components in an inert solvent, evaporating the mixture, preferably in vacuo, and separating the precipitate.

4. A compound containing 1 molecule of hexamethylenetetramine and 1 molecule of methylendiphosphoric acid and forming white crystals easily soluble in water, only little soluble in alcohol and insoluble in ether.

In testimony whereof I have affixed my signature.

ERICH FREUND.